`US009805566B2`

United States Patent
Chosak et al.

(10) Patent No.: US 9,805,566 B2
(45) Date of Patent: Oct. 31, 2017

(54) SCANNING CAMERA-BASED VIDEO SURVEILLANCE SYSTEM

(71) Applicant: AVIGILON FORTRESS CORPORATION, Vancouver (CA)

(72) Inventors: Andrew J. Chosak, Bethlehem, PA (US); Paul C. Brewer, Arlington, VA (US); Geoffrey Egnal, Washington, DC (US); Himaanshu Gupta, Herndon, VA (US); Niels Haering, Reston, VA (US); Alan J. Lipton, Austin, TX (US); Li Yu, Sterling, VA (US)

(73) Assignee: AVIGILON FORTRESS CORPORATION, Vancouver (CA)

(*) Notice: Subject to any disclaimer, the term of this patent is extended or adjusted under 35 U.S.C. 154(b) by 0 days.

(21) Appl. No.: 15/147,288

(22) Filed: May 5, 2016

(65) Prior Publication Data
US 2016/0321888 A1 Nov. 3, 2016

Related U.S. Application Data

(63) Continuation of application No. 11/220,970, filed on Sep. 8, 2005, now Pat. No. 9,363,487.

(51) Int. Cl.
| | |
|---|---|
| *H04N 7/18* | (2006.01) |
| *G08B 13/196* | (2006.01) |
| *G06K 9/00* | (2006.01) |
| *G06K 9/34* | (2006.01) |
| *H04N 5/232* | (2006.01) |

(52) U.S. Cl.
CPC ... *G08B 13/19608* (2013.01); *G06K 9/00771* (2013.01); *G06K 9/342* (2013.01); *G08B 13/1963* (2013.01); *G08B 13/1968* (2013.01); *G08B 13/19613* (2013.01); *G08B 13/19641* (2013.01); *G08B 13/19656* (2013.01); *G08B 13/19682* (2013.01); *G08B 13/19689* (2013.01); *H04N 5/23296* (2013.01); *H04N 7/181* (2013.01)

(58) Field of Classification Search
CPC ..................................................... G08B 13/19
USPC ......................................................... 348/143
See application file for complete search history.

(56) References Cited

U.S. PATENT DOCUMENTS

| | | | | |
|---|---|---|---|---|
| 4,611,244 A | * | 9/1986 | Hanma ................. | G02B 7/282 348/347 |
| 4,920,420 A | * | 4/1990 | Sano .................. | H04N 5/23212 250/201.4 |
| 5,001,650 A | * | 3/1991 | Francis ................ | G01S 3/7864 348/164 |
| 5,164,827 A | | 11/1992 | Paff | |
| 5,434,617 A | | 7/1995 | Bianchi | |

(Continued)

OTHER PUBLICATIONS

Variant ID Web Pages, www.variantid.com, Accessed Aug. 25, 2003, pp. 1-9.

(Continued)

*Primary Examiner* — Leron Beck
(74) *Attorney, Agent, or Firm* — MH2 Technology Law Group, LLP

(57) ABSTRACT

A video surveillance system may include at least one sensing unit capable of being operated in a scanning mode and a video processing unit coupled to the sensing unit, the video processing unit to receive and process image data from the sensing unit and to detect scene events and target activity.

16 Claims, 6 Drawing Sheets

(56) References Cited

U.S. PATENT DOCUMENTS

| | | |
|---|---|---|
| 5,526,041 A | 6/1996 | Glatt |
| 6,075,557 A | 6/2000 | Holliman et al. |
| 6,215,519 B1 | 4/2001 | Nayar et al. |
| 6,340,991 B1 | 1/2002 | Chen et al. |
| 6,359,647 B1 | 3/2002 | Sengupta et al. |
| 6,392,694 B1 | 5/2002 | Bianchi |
| 6,396,961 B1 | 5/2002 | Wixson et al. |
| 6,404,455 B1 | 6/2002 | Ito et al. |
| 6,570,608 B1 * | 5/2003 | Tserng ............ H04N 7/188 348/143 |
| 6,724,421 B1 | 4/2004 | Glatt |
| 6,985,172 B1 * | 1/2006 | Rigney ............ G06K 9/00335 348/149 |
| 7,643,055 B2 * | 1/2010 | Uebbing ............ H04N 7/181 348/152 |
| 7,861,128 B1 * | 12/2010 | Moore ............ G01R 31/31854 714/30 |
| 2002/0054211 A1 * | 5/2002 | Edelson ............ G06T 7/20 348/169 |
| 2002/0140813 A1 | 10/2002 | Trajkovic et al. |
| 2002/0140814 A1 * | 10/2002 | Cohen-Solal ........ G01S 3/7865 348/172 |
| 2002/0158984 A1 | 10/2002 | Brodsky et al. |
| 2002/0167537 A1 | 11/2002 | Trajkovic |
| 2003/0058111 A1 * | 3/2003 | Lee ............ G06K 9/00342 340/573.1 |
| 2004/0096084 A1 * | 5/2004 | Tamoto ............ G06T 7/73 382/104 |
| 2004/0119819 A1 * | 6/2004 | Aggarwal ......... G06K 9/00771 348/143 |
| 2004/0218079 A1 * | 11/2004 | Stavely ............ H04N 5/23293 348/333.11 |
| 2005/0104958 A1 | 5/2005 | Egnal et al. |
| 2005/0134685 A1 | 6/2005 | Egnal et al. |
| 2005/0206741 A1 | 9/2005 | Raber |
| 2008/0088719 A1 * | 4/2008 | Jacob ............ H04N 5/2256 348/241 |

OTHER PUBLICATIONS

Miroslav Trajkovic, "Intruder Tracking with a Pan-Tilt-Zoom Camera", Proc. Asian Conf. on Computer Vision, Melbourne, Australia, Jan. 2002, pp. 1-5.

Miroslav Trajkovic, "Interactive Calibration of PTZ Camera Surveillance Applications", Proc. Asian Conf. on computer Vision, Melbourne, Australia, Jan. 2002, pp. 1-8.

Elsayed E. Hemayed, "A Survey of Camera Self-Calibration", Proceeding of the IEEE Conference on Advanced Video and Signal Based Surveillance, 2003, pp. 1-7.

Robert Collins et al., "A System for Video Surveillance and Monitoring", Robotics Institute, CMU, 2000, pp. 1-70.

Richard Hartley et al., "Multiple View Geometry in Computer Vision", Cambridge University Press, 2000, pp. 141-482.

Alan J. Lipton et al., "Moving Target Classification and Tracking Real-Time Video", Applications of Computer Vision, 1998, WACV'98 Proceedings, Fourth IEEE Workshop on, pp. 1-6.

W. E. L. Grimson et al., "Using Adaptive Tracking to Classify and Monitor Activities in a Site", Computer Vision and Pattern Recognition, 1998. Proceedings. 1998 IEEE Computer Society Conference on, pp. 1-8.

Non-Final Office Action dated Mar. 18, 2005, U.S. Appl. No. 10/740,511, pp. 1-11.

PCT International Search Report dated Jul. 16, 2008, International Application No. PCT/US06/34675, pp. 1-3.

* cited by examiner

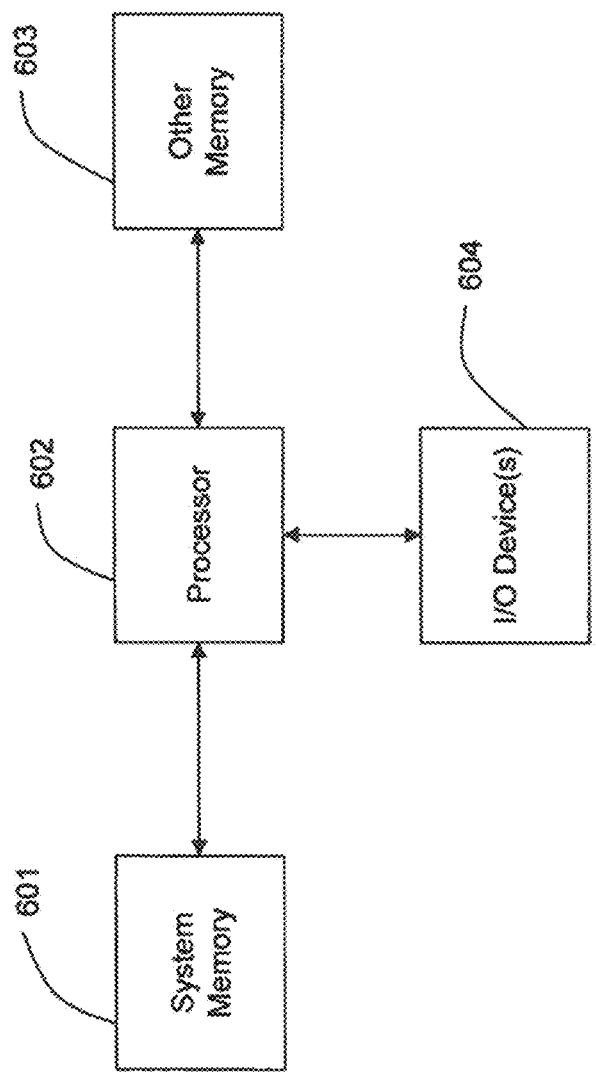

though the second sensing unit to perform an interrogation of that target by analyzing its appearance or behaviors; and generating alerts based on the results of the target interrogation.

SCANNING CAMERA-BASED VIDEO SURVEILLANCE SYSTEM

CROSS-REFERENCE TO RELATED APPLICATIONS

This application is a continuation of U.S. application Ser. No. 11/220,970, filed Sep. 8, 2005, the entire contents of which are incorporated herein by reference its entirety.

FIELD OF THE INVENTION

The present invention is related to methods and systems for performing video-based surveillance. More specifically, the invention is related to such systems involving sensing devices (e.g., video cameras).

BACKGROUND OF THE INVENTION

Many businesses and other facilities, such as banks, stores, airports, etc., make use of security systems. Among such systems are video-based systems, in which a sensing device, like a video camera, obtains and records images within its sensory field. For example, a video camera will provide a video record of whatever is within the field-of-view of its lens. Such video images may be monitored by a human operator and/or reviewed later by a human operator. Recent progress has allowed such video images to be monitored also by an automated system, improving detection rates and saving human labor.

One common issue facing designers of such security systems is the tradeoff between the number of sensors used and the effectiveness of each individual sensor. Take for example a security system utilizing video cameras to guard a large stretch of site perimeter. On one extreme, few wide-angle cameras can be placed far apart, giving complete coverage of the entire area. This has the benefit of providing a quick view of the entire area being covered and being inexpensive and easy to manage, but has the drawback of providing poor video resolution and possibly inadequate detail when observing activities in the scene. On the other extreme, a larger number of narrow-angle cameras can be used to provide greater detail on activities of interest, at the expense of increased complexity and cost. Furthermore, having a large number of cameras, each with a detailed view of a particular area, makes it difficult for system operators to maintain situational awareness over the entire site.

Common systems may also include one or more pan-tilt-zoom (PTZ) sensing devices that can be controlled to scan over wide areas or to switch between wide-angle and narrow-angle fields of view. While these devices can be useful components in a security system, they can also add complexity because they either require human operators for manual control or mindlessly scan back and forth without providing useful information. When an operator attempts to use a PTZ camera to obtain a high-resolution image of a target of interest, for example an intruder unlawfully crossing a perimeter, he or she must manually direct the camera to zoom in on the correct location. This process can be inaccurate and often too slow to catch the target. If a PTZ camera is given an automated scanning pattern to follow, for example sweeping back and forth along a perimeter fence line, human operators can easily lose interest and miss events that become harder to distinguish from the video's moving background. Ideally, the power and flexibility of moving PTZ cameras could be combined with the ability to automatically provide high-resolution imagery of targets of interest, while still providing wide-scale operational awareness for human operators and allowing for effective threat detection.

SUMMARY OF THE INVENTION

The present invention is directed to a system and method that solves the problems described above. It harnesses the power of scanning PTZ cameras to cover large areas quickly while still allowing for efficient use of the cameras as surveillance tools.

According to one embodiment, the invention may comprise a video surveillance system including at least one sensing unit capable of being operated in a scanning mode; and a computer system coupled to the sensing unit, the computer system receiving and processing image data from the sensing unit, detecting scene events and target activity, and generating alerts based on the detected scene events and target activity.

According to another embodiment, the invention may comprise a method of operating a video surveillance system, the video surveillance system including at least one sensing unit capable of being operated in a scanning mode and an acquisition mode. The method of this embodiment may comprise operating a sensing unit in the scanning mode to scan for targets of interest; processing image data from the sensing unit in a scanning mode to detect the presence of an interesting target; and upon detecting an interesting target, operating the sensing unit in the acquisition mode to obtain a closer view of the target.

According to another embodiment, the invention may comprise a method of operating a video surveillance system, the video surveillance system including at least one sensing unit capable of being operated in a scanning mode, an acquisition mode, and an interrogation mode. The method of this embodiment may comprise operating a sensing unit in the scanning mode to scan for targets of interest; processing image data from the sensing unit in a scanning mode to detect the presence of an interesting target; upon detecting an interesting target, operating the sensing unit in the acquisition mode to obtain a closer view of the target; upon acquiring a closer view of the target, using the sensing unit to perform an interrogation of that target by analyzing its appearance or behaviors; and generating alerts based on the results of the target interrogation.

According to another embodiment, the invention may comprise a method of operating a video surveillance system, the video surveillance system including at least one first sensing unit capable of being operated in a scanning mode and at least one second sensing unit capable of being operated in an acquisition mode and an interrogation mode. The method of this embodiment may comprise operating a first sensing unit in the scanning mode to scan for targets of interest; processing image data from the sensing unit in a scanning mode to detect the presence of an interesting target; upon detecting an interesting target, operating the second sensing unit in the acquisition mode to obtain a closer view of the target; upon acquiring a closer view of the target, using the second sensing unit to perform an interrogation of that target by analyzing its appearance or behaviors; and generating alerts based on the results of the target interrogation.

Further embodiments of the invention may include security systems and methods, as discussed above and in the subsequent discussion.

All of the above embodiments may be implemented as software on a computer-readable medium. Furthermore, the invention may be embodied in the form of a computer system running such software. Furthermore, the invention may be embodied in the form of an embedded hardware device running such software.

DEFINITIONS

The following definitions are applicable throughout this disclosure, including in the above.

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

A "target" refers to the computer's model of an object. The target is derived from the image processing, and there is a one-to-one correspondence between targets and objects.

"Pan, tilt and zoom" refers to robotic motions that a sensor unit may perform. Panning is the action of a camera rotating sideward about its central axis. Tilting is the action of a camera rotating upward and downward about its central axis. Zooming is the action of a camera lens increasing the magnification, whether by physically changing the optics of the lens, or by digitally enlarging a portion of the image.

A "best shot" is the optimal frame of a target for recognition purposes, by human or machine. The "best shot" may be different for computer-based recognition systems and the human visual system.

An "activity" refers to one or more actions and/or one or more composites of actions of one or more objects. Examples of an activity include: entering; exiting; stopping; moving; raising; lowering; growing; shrinking, stealing, loitering, and leaving an object.

A "location" refers to a space where an activity may occur. A location can be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" refers to one or more objects engaged in an activity. The event may be referenced with respect to a location and/or a time.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; and a memory chip.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

A "sensing device" refers to any apparatus for obtaining visual information. Examples include: color and monochrome cameras, video cameras, closed-circuit television (CCTV) cameras, charge-coupled device (CCD) sensors, complementary metal oxide semiconductor (CMOS) sensors, analog and digital cameras, PC cameras, web cameras, and infra-red imaging devices. If not more specifically described, a "camera" refers to any sensing device.

A "blob" refers generally to a set of pixels that are grouped together before further processing, and which may correspond to any type of object in an image (usually, in the context of video). Examples of blobs include moving objects e.g., people and vehicles) and stationary objects (e.g., furniture and consumer goods on shelves in a store).

BRIEF DESCRIPTION OF THE DRAWINGS

Specific embodiments of the invention will now be described in further detail in conjunction with the attached drawings in which:

FIG. 6 depicts a block diagram of a system that may be used in implementing some embodiments of the invention.

DETAILED DESCRIPTION OF EMBODIMENTS OF THE INVENTION

Figure 1:
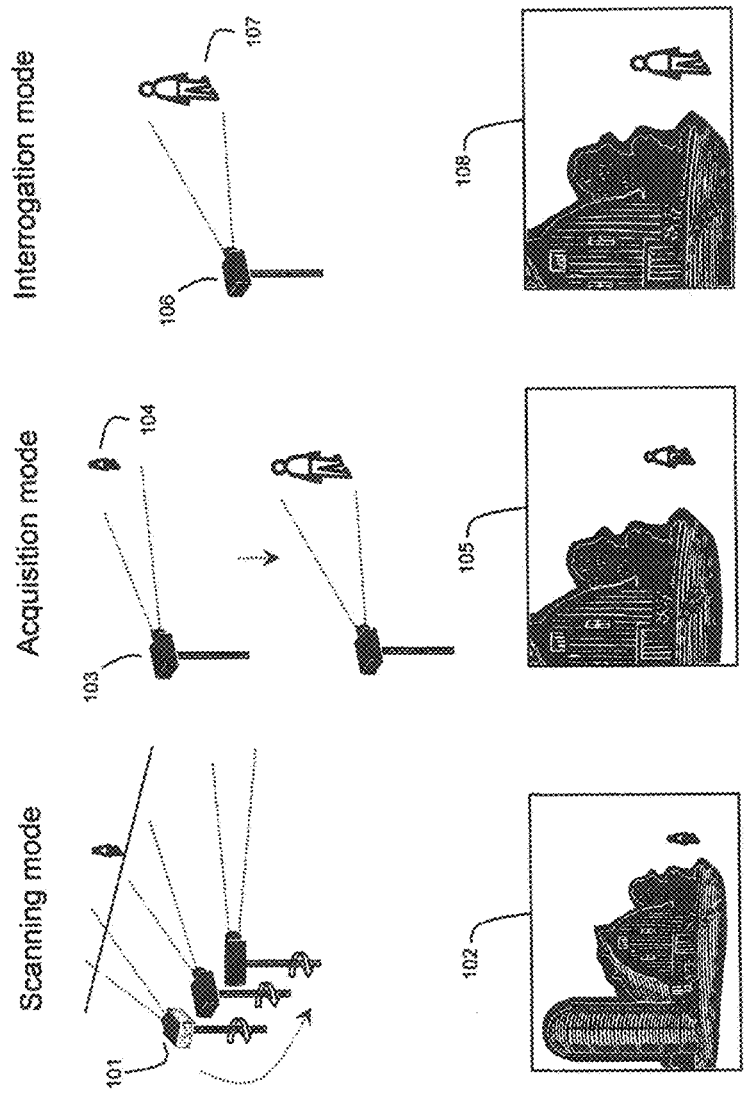
FIGS. 1A-1C depict a conceptual embodiment of the invention, showing the three different modes in which a single sensing device may operate.

FIGS. 1A-1C depict a conceptual embodiment of the invention, showing the three different modes in which a single sensing device may operate. While the discussion below considers a single one of the sensing devices shown in FIG. 1A, embodiments of the invention may involve more than one sensing device, as shown, and the discussion is equally applicable to each such sensing device. In scanning mode, pan-tilt-zoom camera 101 follows a predefined scan path to continuously cover a wide area. This scan path may include panning, tilting, and/or zooming. Scanning the camera over a wide area allows for a larger area to be covered than what is visible to the camera when it is stopped at one fixed location. While in scanning mode, moving camera 101 provides frames such as frame 102, showing an example view of the world. Note that the view contains a building and a human target, which appears quite small in the camera's field of view. Once the scanning camera sees a target of interest, which is determined by a number of different criteria, it switches into acquisition mode. Camera 103 represents the same physical object as camera 101, albeit in a different mode. In acquisition mode, the camera is made to move so as to produce a better view of the detected target 104, using its pan, tilt, and zoom controls. Producing a better view of the detected target may, for example, including zooming in to get a higher resolution view of the target. Example frame 105 shows what the camera's field of view might look like while zooming in to obtain this better view of the detected target. Once the camera has obtained this better view of the detected target, it might enter interrogation mode, where the target's appearance and activities are further analyzed. Camera 106 represents the same physical object as camera 103, albeit in a different mode. In this mode, the camera might remain stationary, and simply watch the better view of the target 107 for a period of time. Optionally, the camera might actively continue to move in order to maintain the better view of the target, for example, by compensating for target motion, for example, if the target moves in such a way as to take it out of the frame. Sample frame 108 represents what a typical camera frame might look like in the interrogation mode.

The camera of the present invention may, for example, comprise a video camera (or other video sensing device) having a motorized zoom lens and a motorized platform that allows the camera to pan and/or tilt. The video camera and platform will be coupled to a computer running software that performs a number of tasks, depending on which mode the camera is in. In scanning mode, the tasks include compensating for camera motion, segmenting image pixels into foreground and background regions, combining foreground pixels into blobs, associating blobs over time to form targets, determining when targets split and merge, tracking and classifying tracked targets, and generating alerts if the targets engage in predetermined activity or satisfy some predetermined criteria. Examples of detectable action include but are not limited to crossing a virtual tripwire in the scene, appearing, disappearing, loitering, and inserting or removing an item from the scene. Examples of alerts that might be generated when these actions occur include but are not limited to sending an e-mail or displaying a visual alert on a computer screen. Visual alerts generated when these actions occur might contain images of the video frames where events occurred, or they may contain other visual representations of the events, such as their location on a scene model. Furthermore, detection of a specified event might cause the camera to switch into its second mode, acquisition mode, to obtain a better view of the target.

In acquisition mode, the camera is actively controlled through its pan, tilt, and zoom controls in order to direct it to capture a better view of the detected target. Control may be done through a hardware interface or through a software interface to the camera. The camera is controlled so that the target's appearance in its video imagery remains centered and is made as large as possible. Software tasks performed in this mode include compensating for camera motion, feature extraction, template matching to continuously locate the target of interest in the scene, and camera control in order to continuously adjust the camera's field of view. The camera will remain in target acquisition mode until, for example, a suitably better target view has been achieved, a certain amount of time has passed, or an external trigger has been received that indicates that the camera should return to scanning mode. Once target acquisition is complete, the camera may either return to its scanning mode or may proceed to its interrogation mode.

In interrogation mode, further analysis of the target is performed to detect further activities of interest or simply to collect more information. In the target acquisition mode, the camera was controlled so that it has a better detailed view of the target of interest. This might include a view of a target from a suitable angle, of a sufficiently high resolution, or of a specific important part of the target. Target interrogation mode might be very brief and only involve analysis of several frames containing the target; it might be longer and involve watching the target for some time with a fixed camera; or it may be longer and involve following the target for some time by controlling the camera's pan, tilt, and zoom, all the while maintaining the improved view of the target. Software tasks performed in this mode include but are not limited to background modeling, target blobization and tracking, target classification, and target activity recognition. If a target is analyzed and it is determined that it is engaging in some predetermined activity or satisfying some predetermined criteria, alerts may be generated. Examples of detectable action include crossing a virtual tripwire in the scene, appearing, disappearing, loitering, and inserting or removing an item from the scene. Examples of alerts that might be generated when these actions occur might include sending an e-mail or displaying a visual alert on a computer screen. Once target interrogation is complete, the camera will return to its scanning mode, resuming its search for targets or events of interest. Optionally, the camera may switch back and forth between target acquisition mode and target interrogation mode, periodically acquiring a good view of the target and then following it up with analysis. The camera may also periodically revisit targets that it has previously interrogated for further analysis, or it may simultaneously track multiple targets at once by acquiring and interrogating each one in turn.

In one embodiment of the invention, one sensing unit is always in scanning mode and directs a second sensing unit to do target acquisition and interrogation. In this way, the first sensing unit can continue to scan without ever missing any events due to zooming in on one specific target. The second sensing unit may either never enter a scanning mode, or may nominally be in a scanning mode except when directed by the first sensing unit to acquire and interrogate a target. For example, the methods discussed in U.S. patent application Ser. No. 10/740,551, filed Dec. 22, 2003, and incorporated herein by reference, may be used to coordinate operations between sensing units.

Figure 2:
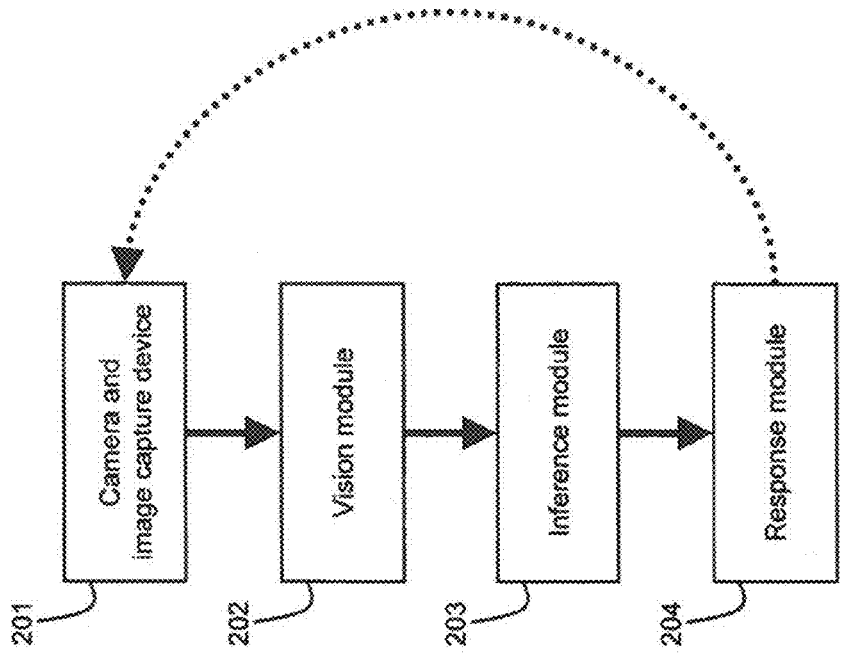
FIG. 2 depicts a conceptual block diagram of the different modules comprising a sensing unit according to an embodiment of the invention.

FIG. 2 depicts a conceptual block diagram of the different modules comprising a sensing unit according to an embodiment of the present invention. Camera and image capture device 201 represents a sensor device capable of obtaining a sequence of video images. This device may comprise any means by which such images may be obtained. Sensing device 201 has means for attaining higher quality images, and, in this embodiment, is capable of being panned, tilted, and zoomed and may, for example, be mounted on a platform to enable panning and tilting and be equipped with a zoom lens or digital zoom capability to enable zooming.

Vision module 202 represents a module that processes incoming image data, for example, through target detection, classification, and tracking. This module includes any algorithms required to compensate for camera motion present during video capture. This module includes algorithms that collect statistical information about targets being tracked. Depending on the software algorithms that comprise this vision module, various levels of analysis on the targets may be performed. If camera calibration data is known about the camera that produced the incoming imagery, then targets may be geo-located in space or associated with a map or satellite image of the scene. The specific algorithms comprising the vision module vary depending on which mode the camera is in (scanning, acquisition, or interrogation). If the current mode requires that the camera be actively controlled, this module may feed back control commands to the camera and image capture device 201.

Inference module 203 represents a module that processes the analysis results of vision module 202 in order to identify targets satisfying certain predetermined criteria or to detect events or activities of interest. Criteria, events, and activities of interest may be built into the invention or may be configurable by a user of the invention. This module includes algorithms that analyze the statistical information about tracked targets as computed by the vision module, as well as other auxiliary information computed by that module, and determines whether a significant event has occurred. The analysis of this module is not done on video imagery itself; rather, it is done at a higher level, based on the preprocessing done by the vision module.

Response module 204 receives notices of actionable events from inference module 203, and implements the appropriate course of action for those notices. Responses that this module may generate might include an email notification or visual alert describing a scene or target of interest. This module may also be required to change camera modes. For example, if the camera is in scanning mode and a target of interest is detected, the response module is responsible for telling the camera to switch over to acquisition mode. It might do this by feeding a control command to the camera and image capture device 201.

Figure 3:
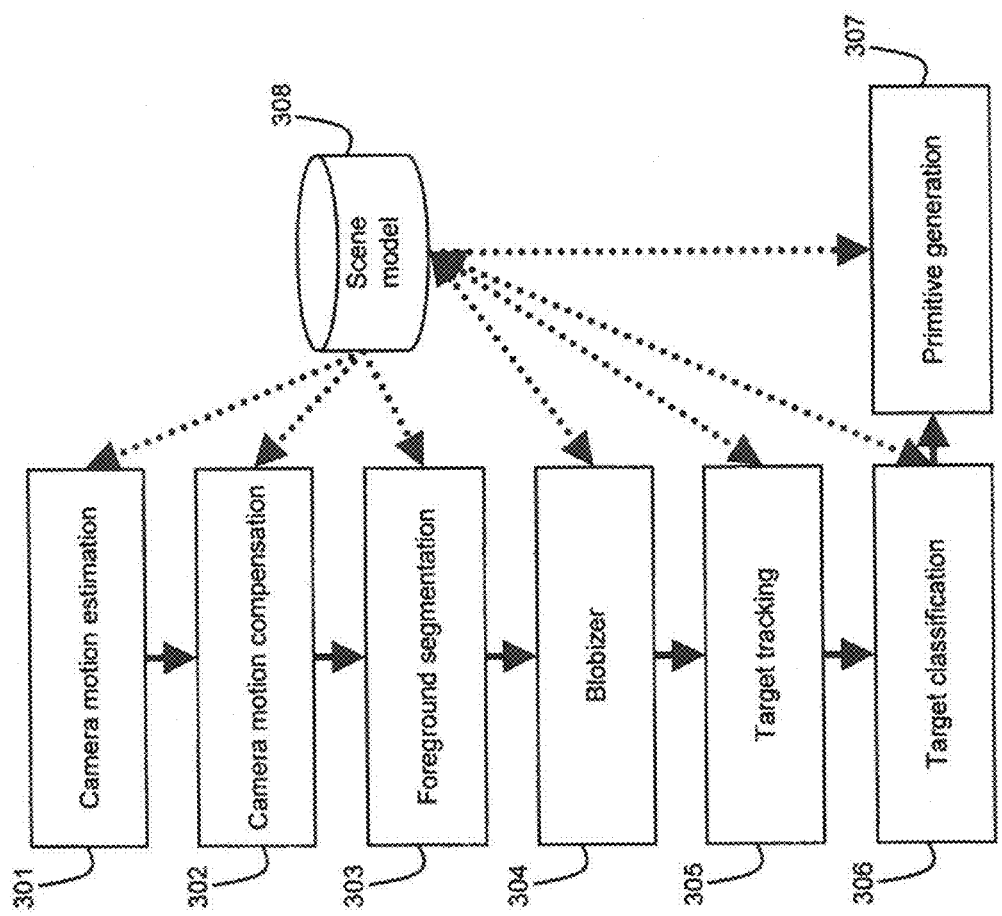
FIG. 3 depicts a conceptual block diagram of the vision module when the camera is in scanning mode.

FIG. 3 depicts a conceptual block diagram of the vision module when the camera is in scanning mode. In this mode, the vision module processes incoming frames from a moving camera, detects objects and moving targets, and generates summary statistics for them. Incoming frames from the camera and image capture device first go to a module 301 for camera motion estimation, which analyzes the frames and determines how the camera was moving when it was generated. If real-time telemetry data is available from the camera itself, it can serve as a guideline or as a replacement for this step. However, such data is either usually not available, not reliable, or comes with a certain amount of delay that makes it unusable for real-time applications. Many state-of-the-art algorithms exist to perform camera motion estimation. One such technique is described in commonly assigned U.S. patent application Ser. No. 09/609,919, filed Jul. 3, 2000 (from which has issued U.S. Pat. No. 6,738,424), and incorporated herein by reference. Note that module 301 may also make use of scene model 308 if it is available. Many common techniques make use of a scene model such as a background mosaic as a way to aid in camera motion estimation. Another technique is described in co-pending U.S. patent application Ser. No. 11/222,233, entitled "Enhanced Processing for Scanning Video," and hereafter referred to as Chosak05.

Once the camera motion has been determined, then the relationship between successive frames is known. This relationship might be described through a camera projection model consisting of, for example, an affine or perspective projection. Incoming video frames from a moving camera can then be registered to each other so that differences in the scene (e.g., foreground pixels or moving objects) can be determined without the effects of the camera motion. Frames are registered to a common reference through a module 302 that does camera motion compensation. Successive frames may be registered to each other or may be registered to scene model 308, which might for example be a background mosaic. A technique that uses a scene model in this way is described in Chosak05.

Once frames have been registered to a common reference, then foreground segmentation can be performed by module 303. This module segments pixels in registered imagery into background and foreground regions. Various common frame segmentation algorithms exist. Motion detection algorithms detect only moving pixels by comparing two or more frames over time. As an example, the three frame differencing technique, discussed in A. Lipton, H. Fujiyoshi, and R. S. Patil, "Moving Target Classification and Tracking from Real-Time Video," Proc. IEEE WACV '98, Princeton, N.J., 1998, pp. 8-14 (subsequently to be referred to as "Lipton, Fujiyoshi, and Patil"), can be used. Unfortunately, these algorithms will only detect pixels that are moving and are thus associated with moving objects, and may miss other types of foreground pixels. For example, a bag that has been left behind in a scene and is now stationary could still logically be considered foreground for a time after it has been inserted. Change detection algorithms attempt to identify these pixels by looking for changes between incoming frames and some kind of background model, for example, scene model 308. Over time, a sequence of frames is analyzed and a background model is built up that represents the normal state of the scene. When pixels exhibit behavior that deviates from this model, they are identified as foreground. As an example, a stochastic background modeling technique, such as the dynamically adaptive background subtraction techniques described in Lipton, Fujiyoshi, and Patil and in commonly-assigned U.S. patent application Ser. No. 09/694,712, filed Oct. 24, 2000, and incorporated herein by reference (and hereafter referred to as "Lipton00"), may be used. A technique that incorporates a scene model specifically maintained for a scanning model is described in Chosak05. A combination of multiple foreground segmentation techniques may also be used to give more robust results.

Foreground segmentation module 303 is followed by a "blobizer" 304. A blobizer groups foreground pixels into coherent blobs corresponding to possible targets. Any technique for generating blobs can be used for this block. For example, the approaches described in Chosak05 or in Lipton, Fujiyoshi, and Patil may be used. The results of blobizer 304 may be used to update the scene model 308 with information about what regions in the image are determined to be part of coherent foreground blobs. Scene model 308 may also be used to affect the blobization algorithm, for example, by identifying regions where targets typically appear smaller.

Blobizer 304 is followed by target tracking module 305. This module determines how blobs associate with targets in the scene, and when blobs merge or split to form possible targets. A typical target tracker algorithm will filter and predict target locations based on its input blobs and current knowledge of where targets are. Examples of tracking techniques include Kalman filtering, the CONDENSATION algorithm, a multi-hypothesis Kalman tracker (e.g., as described in W. E. L. Grimson et al., "Using Adaptive Tracking to Classify and Monitor Activities in a Site", CVPR, 1998, pp. 22-29), and the frame-to-frame tracking technique described in Lipton00. Target tracking algorithms that take into account the scanning nature of the camera, such as the one described in Chosak05, may also be used. If the scene model contains camera calibration information, then module 305 may also calculate a 3-D position for each target. A technique such as the one described in U.S. patent application Ser. No. 10/705,896, filed Nov. 13, 2003, hereafter referred to as Egnal03, and incorporated herein by reference, may also be used. This module may also collect other statistics about targets such as their speed, direction, and whether or not they are stationary in the scene. This module may also use a scene model 308 to help it to track targets, and/or may update scene model 308 with information about the targets being tracked.

Target tracking module 305 is followed by target classification module 306. This module determines the type of target being tracked. A target may be, for example, a human, a vehicle, an animal, or another specific type of object. Classification can be performed by a number of techniques, and examples of such techniques include using a neural network classifier and using a linear discriminant classifier, both of which techniques are described, for example, in Collins, Lipton, Kanade, Fujiyoshi, Duggins, Tsin, Tolliver, Enomoto, and Hasegawa, "A System for Video Surveillance and Monitoring: VSAM Final Report," Technical Report CMU-RI-TR-00-12, Robotics Institute, Carnegie-Mellon University, May 2000. This module may also use a scene model 308 to help it classify targets, and/or may update scene model 308 with information about the targets being classified.

Finally, primitive generation module 307 is used to provide summary statistical information about the content of the scene. These primitives contain information that the downstream inference module 203 might need. Included in these primitives is information about each target seen by the vision module, including for example size, position, velocity, color, and texture. These primitives may also contain information from scene model 308, for example, the camera motion for the current frame as well as other environmental changes observed in the scene. Further details of an exemplary process for primitive generation may be found in commonly-assigned U.S. patent application Ser. No. 09/987,707, filed Nov. 15, 2001, hereafter referred to as Lipton01, and incorporated herein by reference in its entirety.

In scanning mode, inference module 203 receives the primitive summary statistics from vision module 202, and processes them to detect targets that satisfy certain criteria or to infer when events of interest have occurred in the scene. In scanning mode, events of interest may include targets moving too quickly or too slowly, targets entering an area of interest, targets leaving a bag behind, or targets stealing something from a scene. These rules may either be automatically detected as part of the system configuration or they may be specified by a user of the invention through some interface. The inference module might do its processing through an approach, for example, such as the one described in Lipton01.

Events of interest may be defined in terms of an image frame, for example, detecting when a target appears in a certain part of the frame. However, since the camera is moving, this might not be as useful as allowing events to be defined in terms of an overall scene, Therefore, rules may also be defined in terms of an overall scene model, for example, defining a virtual tripwire or area of interest on a background mosaic representing the scanning camera's entire visible range.

Once a target of interest or an event of interest is detected by the inference module, it sends notification of the event on to response module 204. This notification might include all of the information about the target that engaged in the event, including, for example, its location, direction, and appearance. This notification might also include the latest information about the scene model received from the vision module, including, for example, information about the background region that the target is currently in.

In scanning mode, the inference module is also responsible for maintaining a list of currently active targets of interest, along with information about when they were last seen. It may periodically send this information on to the response module to make sure that each target is seen over time, even if the targets do not continue to perform events of interest. The system may also be configured to track multiple targets of interest at once, and the inference module is responsible for handling switching among targets. This might be done by tracking one target for a time and then switching to another target; or it might be done by rapidly switching between two targets.

In scanning mode, response module 204 implements the appropriate course of action in response to events as detected by inference module 203. Responses that this module may generate might include an email notification or visual alert describing a scene or target of interest. Visual alerts may include frame imagery of the scene or target, or they may contain other visual representations, for example, the location of a target on the system's scene model. For example, as the camera is scanning back and forth, it might generate a visual alert every time a vehicle is seen in a certain area Responses that might be generated from this module in scanning mode might include those mentioned, for example, in Lipton01. Another type of response that might be generated is one that provides real-time information about the target or scene model to some third-party listener, for example, one that might attempt to acquire that target via some non-visual means or that might want to generate real-time video markup of that target's activities. Another type of response that might be generated by this module in scanning mode is to change the mode of the camera to acquisition mode, telling the camera to obtain a better view. This change affects camera and image capture device 201, vision module 202, and inference module 203 as well, switching the overall mode of the system. The response information generated by the response module when switching modes includes information about the target to be acquired, including for example its latest position, speed, direction, and appearance. This information is used, for example, to initialize the vision module in order to aid in its processing while in that second mode. Information about the scene model sent from the inference engine might also be passed on to the vision module for aid in initialization of algorithms.

Figure 4:
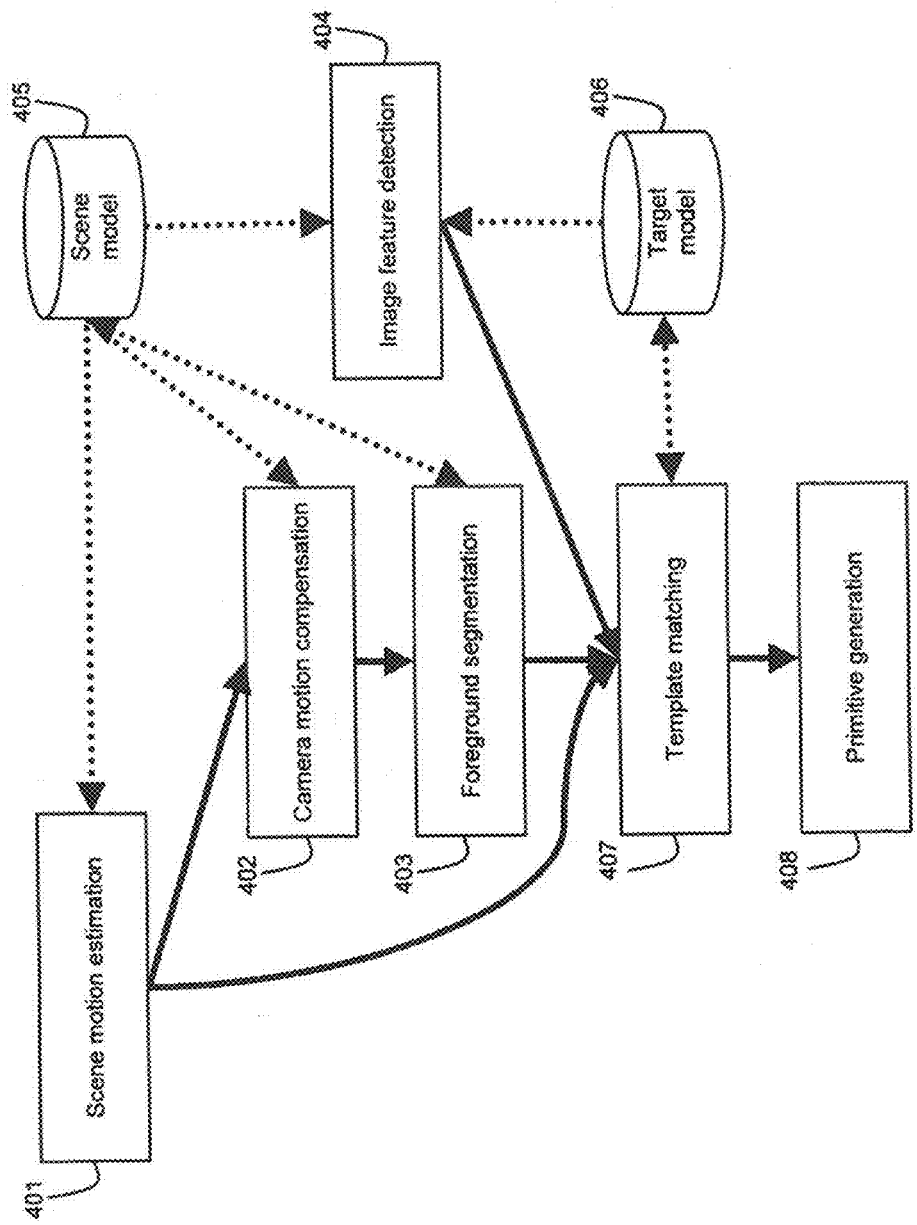
FIG. 4 depicts a conceptual block diagram of the vision module when the camera is in acquisition mode.

FIG. 4 depicts a conceptual block diagram of the vision module when the camera is in acquisition mode. In this mode, the module processes incoming frames from a moving camera that is attempting to acquire an improved view of a target of interest. Whereas in scanning mode the camera motion is likely independent of target motion, in this mode the camera might be directed to pan and tilt to keep the target of interest in the center of the camera view while increasing its size in pixels by zooming in FIG. 4 shows an example implementation of the vision module that uses template matching to continuously track a target in the field of view while the camera is being moved. This implementation may be initialized with current information about the target being tracked when the camera is switched from scanning mode.

Module 401 performs scene motion estimation and attempts to find both camera motion and the motion of the target being tracked. This module attempts to find camera motion using similar techniques to its counterpart in scanning mode. However, whereas in scanning mode it is assumed that the majority of the scene is background, in acquisition mode it is assumed that the target of interest will mostly likely take up more of the scene. This, in turn, leaves less distinguishable features, which are usually one of the main inputs to typical camera motion estimation algorithms. For this reason, it is desirable to use a camera motion estimation technique that attempts to also distinguish the motion of the target being tracked, One common approach is to use an optical flow technique to look at the motion of all pixels in the scene. The dominant motion will be the camera motion; the second most dominant should be the target motion. Another technique is described in Egnal03. Note that scene model 405 may be used to initialize this motion estimation step; when first entering the acquisition mode, some information may be known about the area of the scene where the target is located. For example, a chunk from a background mosaic containing information about the background region behind the target may be used to aid in camera motion estimation. This scene model 405 may, therefore, be derived from or in fact be the same model as scene model 308 while in scanning mode.

Modules 402 and 403 perform similarly to their counterparts in scanning mode. However, due to the decreased number of background pixels visible in the scene, it is possible that the results of foreground segmentation module 403 may not be as accurate as when it is in scanning mode. For this reason, the foreground pixels output from the combination of modules 401, 402, and 403 are used as just one input to template matching module 407.

Module 404 performs image feature detection, and is used to detect features in the video imagery that may provide cues as to where in the frame the moving target is located. For example, edges or texture patches may be detected near the area where the target is predicted to be. As another example, intensity or color histograms might be extracted from areas in the scene. Target model 406, which contains the current model of the tracked target's appearance and motion characteristics, might be used to initialize these algorithms. Initialization of target model 406 might use information from the last known appearance of the target when the system was in scanning mode.

Module 407 performs template matching and attempts to identify the location of the target being tracked in the incoming frames from the moving camera. It can use a variety of cues to do this, including the target motion output of module 401, the foreground segmentation output of module 403, and the image feature outputs of module 404. Other calculable features might also be used to form a template that describes the current appearance of the target being tracked. A current model of the tracked target's appearance and motion characteristics is contained in target model 406; this model is used to match against different areas of the image in order to find the target's location. An approach such as the one described in Egnal03 might be used to weight the different features in order to compute the best match. Ideally, an approach that is robust to different camera motions and changes in the target's appearance should be used. Once the target has been located in the latest image, the target model is updated so that it once again contains up-to-date information about the target.

Finally, primitive generation module 408 operates similarly to corresponding primitive generation module 307. It generates summary statistics about the target as it appears in the field of view, as based on information calculated by the previous modules.

In acquisition mode, inference module 203 receives the primitive summary statistics from vision module 202, and processes them to determine how to move the camera in order to obtain a better view of the target, and when the target has been suitably acquired. While in acquisition mode, the vision module attempts to locate the target being tracked in the scene, for example by using template matching as described above. The summary statistics generated from the vision module contain the latest information about the target's location and appearance in the frame. By analyzing these statistics, the inference module determines whether or not the view of the target is suitable for whatever downstream processing or use a user might have. The criteria for a "good" view of a target might include, for example, its size in pixels in the frame. Another example of a suitably improved view that might be detected by the inference engine is the presence of the "best shot" of a target, for example, the shot of a human targets face. A technique such as the one described in Egnal03 might be used for this application.

Once a suitably improved view of a target has been achieved, as determined by the criteria either built into the system or defined by a user of the invention, as detected from analyzing the primitive summary statistics from the vision module, the inference module sends notification of this on to response module 204. This notification might include all of the information about the newly acquired target, including, for example, its location, direction, and appearance.

While a suitably improved view of the target has not yet been achieved, the inference module still sends the latest target position information on to response module 204, so that the camera can be directed to continue to track the target. This position information might consist of the position and size of the target in the video frame.

In acquisition mode, the inference module is also responsible for determining if target acquisition has failed for some reason. For example, if the target moves too quickly to be followed by the camera, or if it becomes too small to be seen, the primitive summary statistics will cease to contain useful information about it. Also, if too much time has passed, as determined by system or user thresholds, and a suitable view has still not been achieved, the acquisition process may "time out" and fail. In this case, the inference module might send indication of a failed acquisition on to response module 204.

In acquisition mode, response module 204 implements the appropriate course of action in response to target updates and events as detected by inference module 203. Target update information contains information about the latest appearance of the target in the video frames processed by the vision module. Detected event notifications include both a successful and an unsuccessful target acquisition.

Target update information is received while the target is being acquired. It is the responsibility of the response engine to take the current location of the target and direct the camera how to adjust its pan, tilt, and zoom settings to continue to obtain a better view. The signal from the response module can be sent in any way from the computer system to the PTZ unit, using any protocol or medium, including through a cable or over a wireless network. Achieving a good view of a target may take only a few camera movements (for example, centering the target and then zooming in on it), or it may take a longer sequence of movements. For example, if the target continues to move while the camera is trying to acquire it, it may take a longer time to get a good view.

Note that typical PTZ camera control allows for pan and tilt to be directly controlled through settings in angular radians, and zoom to be controlled through focal length or sonic sliding control. Therefore, the response module must be able to translate camera frame image coordinates (which describe the position and size of the target as passed along by the inference module) into real-world camera commands. One simple technique for doing this is described in Egnal03, and it may be used in some embodiments of the present invention. A more robust solution involves knowing some calibration information about the camera that describes how the imagery it produces is related to its physical settings and orientation. For example, knowing the camera's focal length in pixels allows knowledge about the relationship between target sizes in pixels and zoom level to be derived. This, in turn, is useful when zooming into a target to enlarge it, because it provides information about how much zoom is required in order to enlarge a target's size by a certain amount. Similarly, knowing the focal length provides knowledge about how an angular pan or tilt in radians translates to an image shift in pixels in the imagery. Various calibration techniques exist, including detecting a known calibration pattern that has been placed in the field of view and using that to derive the camera's internal parameters. Various autocalibration techniques also exist that can be used to derive the camera's calibration parameters by, for example, moving the camera in a known way. Several exemplary techniques that can be used to do this are described in R. I. Hartley and A. Zisserman, *Multiple View Geometry in Computer Vision*, Cambridge University Press, 2000.

When event notifications are received by the response module from the inference module, it may direct the system to change modes. If an event is received signaling a successful target acquisition, then the response module might change the mode of the camera to interrogation mode, telling the camera to perform further analysis on the now-acquired target. This change affects camera and image capture device 201, vision module 202, and inference module 203, as well, switching the overall mode of the system. The response information generated by the response module when switching modes includes information about the target to be interrogated, including, for example, its latest position, speed, direction, and appearance. This information is used, for example, to initialize the vision module in order to aid in its processing while in interrogation mode. This response information may also contain the latest available scene model data, for example, describing the area where the target has been acquired. If an event is received signaling a failed target acquisition, then the response module might change the mode of the camera back to scanning mode, telling the camera to resume its normal scan path. This change affects camera and image capture device 201, vision module 202, and inference module 203, as well, switching the overall mode of the system. External responses may also be generated when this occurs; for example, an e-mail notification or visual alert might be sent to notify a user about the acquisition failure.

While in acquisition mode, the response module may also be used to provide real-time information about the target or scene model to some third-party listener, for example, one that might attempt to acquire that target via some non-visual means or that might want to generate real-time video markup of that target's activities.

Figure 5:
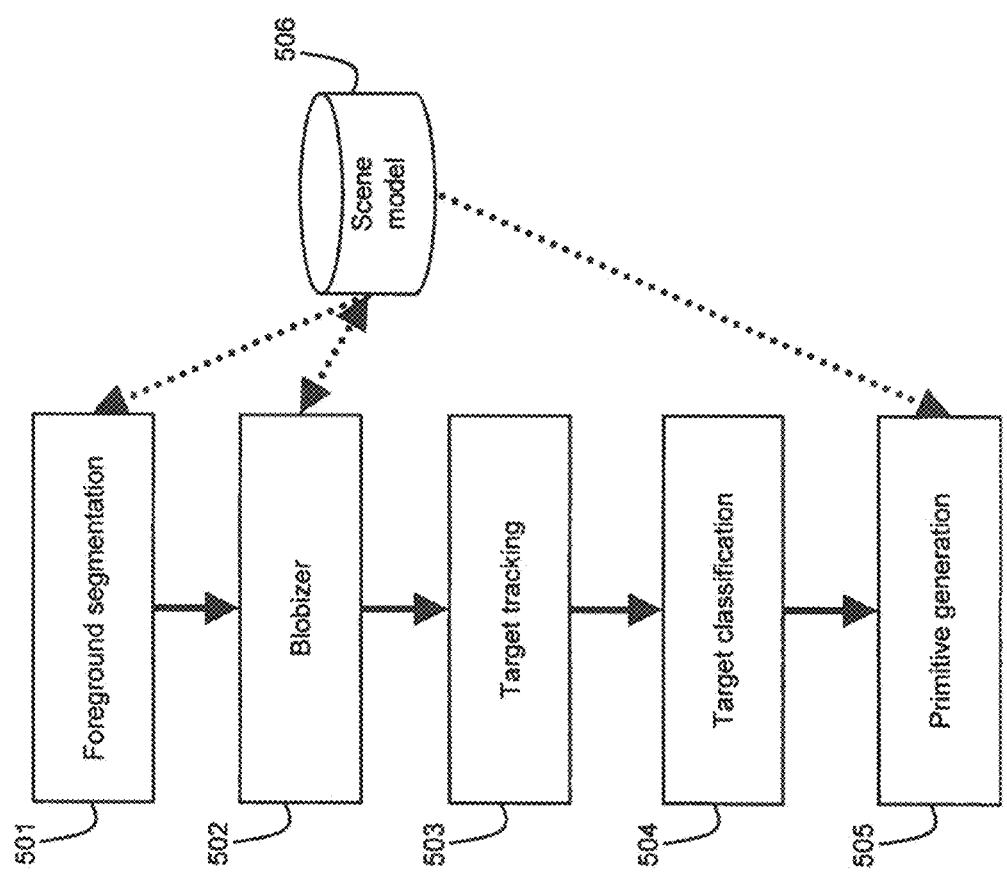
FIG. 5 depicts a conceptual block diagram of the vision module when the camera is in interrogation mode.

FIG. 5 depicts a conceptual block diagram of the vision module when the camera is in third interrogation mode. In this mode, the vision module processes incoming frames from a camera that is providing a good view of a target that has violated some condition(s) and has been acquired in the previous mode. Just as in scanning mode, this module ultimately produces primitive summary statistics. The exemplary block diagram depicted in FIG. 5 shows algorithms that might be appropriate if the camera is stationary during interrogation mode (although, as discussed below, it need not be). Incoming frames from the camera and image capture device first go to a module 501 for foreground segmentation, which analyzes the frames and detects the regions of the frame that correspond to foreground objects. Algorithms similar to the ones used in the exemplary scanning mode implementation described above might be used, without the now unnecessary camera motion estimation and compensation steps. Note that as in previous steps, a scene model 508 might be used to aid in this process. This scene model may also be initialized with some state upon entry into interrogation mode, as provided by the response module in acquisition mode.

Module 502 performs blobization in a similar way to its counterpart 304 in scanning mode. It groups foreground pixels together into coherent blobs, using similar techniques to those described above. As in scanning mode, a scene model 508 might be used to aid in the process.

Module 503 performs target tracking in a similar way to its counterpart 305 in scanning mode. It associates blobs with moving targets and detects when targets split and merge, using similar techniques to those described above.

Module 504 performs target classification in a similar way to its counterpart 306 in scanning mode. It classifies a target's type and may use similar techniques to those described above. However, since a better view of the acquired target is now available, target classification results may be more accurate, or may allow for more advanced algorithms that take advantage of the higher resolution appearance.

Finally, primitive generation module 505 is used to provide summary statistical information about the target that has been acquired, along with other targets or activity in the scene. These primitives contain similar information to those described above for its counterpart 307 in scanning mode, including data from scene model 506. Note that additional interrogation-specific information may also be contained in these primitives. For example, if one of the goals of target interrogation is to extract a close-up of a target's face for a downstream facial recognition algorithm, the primitives may contain information that would aid in that task.

The camera and image capture device does not have to necessarily be stationary while in interrogation mode. For example, the camera may continue to actively track the target for a time. In this case, due to the camera motion contained within incoming video frames, algorithms more similar to the ones used in scanning and acquisition modes would be required. For example, these algorithms may include template matching for target tracking. These algorithms are described above. If the camera is moving during the interrogation phase, then the primitives generated by module 505 would also contain information about the camera motion.

In interrogation mode, inference module 203 receives the primitive summary statistics from vision module 202, and processes them to detect targets that satisfy certain criteria or to infer when events of interest have occurred in the scene. This is very similar to its functionality while in scanning mode. Because the view of the target is much better, events of interest might also contain things like identifying a certain person based on their face or identifying a certain vehicle based on its license plate. As in scanning mode, these rules may either be automatically detected as part of the system configuration, or they may be specified by a user of the invention through some interface.

Once a target of interest or an event of interest is detected by the inference module, it sends notification of the event on to response module 204. This notification might include, for example, some or all of the information about the target that engaged in the event, which may include, for example, its location, direction, and appearance. This notification might also include the latest information about the scene model received from the vision module, including, for example, information about the background region that the target is currently in.

In interrogation mode, the inference module is also responsible for determining other criteria for when to return to scanning mode, and sending a notification of these on to the response module. This may depend on system or user configuration. For example, a certain time limit for interrogation may be set, after which the camera should return to scanning mode. Other determining factors, such as the acquired target leaving the scene, might be used to make this decision.

If interrogation mode is utilizing a moving camera that continuously tracks the target being interrogated, the inference module still sends the latest target position information on to response module 204, so that the camera can be directed to continue to track the target. This position information might, for example, consist of the position and size of the target in the video frame.

In interrogation mode, response module 204 implements the appropriate course of action in response to events as detected by inference module 203. Its behavior in this mode is similar to that in scanning mode. As in scanning mode, responses that this module may generate might include e-mail notifications, visual alerts, or other responses. Visual alerts may include frame imagery of the scene or target, or they may contain other visual representations, for example, the location of a target on the system's scene model. Another type of response that might be generated is one that provides real-time information about the target or scene model to some third-party listener, for example one that might attempt to acquire that target via some non-visual means or that might want to generate real-time video markup of that target's activities. Another type of response that might be generated by this module in scanning mode is to change the mode of the camera back to scanning mode or acquisition mode. If the inference module sends along a signal saying that interrogation is complete, because an event of interest was detected or, for example, a certain amount of time passed, the camera may be switched back to scanning mode. If the inference module sends along a signal saying that interrogation failed, for example because the target left the visible scene, the camera may either be switched back to scanning mode to resume regular scanning, or it may be switched back to acquisition mode to attempt to re-acquire the target. In the former case, a notification of failed interrogation may be sent to a user of the invention through at least one of the methods described above. In the latter case, response information may contain the latest available scene model as received from the inference module, for use in initializing the algorithms in the vision module.

If interrogation mode is utilizing a moving camera that continuously tracks the target being interrogated, it is also the responsibility of the response engine to take the current location of the target and direct the camera how to adjust its pan, tilt, and zoom settings to continue to follow the target. This is done in a similar way to the technique described above for acquisition mode.

Some embodiments of the invention, as discussed above, may be embodied in the form of software instructions on a machine-readable medium. Such an embodiment is illustrated in FIG. 6. The computer system of FIG. 6 may include at least one processor 602, with associated system memory 601, which may store, for example, operating system software and the like. The system may further include additional memory 603, which may, for example, include software instructions to perform various applications. The system may also include one or more input/output (I/O) devices 604, for example (but not limited to), keyboard, mouse, trackball, printer, display, network connection, etc. The present invention may he embodied as software instructions that may be stored in system memory 601 or in additional memory 603. Such software instructions may also be stored in removable or remote media (for example, but not limited to, compact disks, floppy disks, etc.), which may be read through an I/O device 604 (for example, but not limited to, a floppy disk drive). Furthermore, the software instructions may also be transmitted to the computer system via an I/O device 604 for example, a network connection; in such a case, a signal containing the software instructions may be considered to be a machine-readable medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. A video surveillance system comprising:
   a processor;
   a storage device storing software instructions; and
   a camera configured to pan, tilt, and zoom,
   wherein the software instructions, when executed by the processor, control the video surveillance system to perform operations comprising:
      controlling the camera to scan a scene using a first field of view;
      determining a first set of video primitives using first image data received from the camera during the scan, the first set of video primitives describing targets in the first field of view, motion of the camera during the scan, and the scene in the first field of view;
      detecting a target of interest in the first field of view using the first set of video primitives;
      based on information about the target of interest in the first set of video primitives, controlling the camera to continuously track the target of interest using a second field of view by moving the camera;
      determining a second set of video primitives using second image data received from the camera during the continuous tracking, the second set of video primitives describing the target of interest in the second field of view, motion of the camera during the continuous tracking, and the scene in the second field of view;

determining a third field of view of the target of interest using information describing the target of interest in the second set of video primitives and based on image quality criteria;

controlling the camera to obtain the third field of view;

determining that the camera has obtained in the third field of view;

determining a third set of video primitives using third image data received from the camera from the third field of view, the third set of video primitives describing the target of interest in the third field of view;

determining an identity of the target of interest using the third set of video primitives; and issuing an alert including the identity of the target of interest.

2. The video surveillance system of claim 1, wherein the operations further comprise:

determining that the camera has failed to obtain the third field of view; and after failing to obtain the third field of view, controlling the camera to rescan the scene using the first field of view.

3. The video surveillance system of claim 1, wherein the information about the target of interest in the first set of video primitives comprises an event in the scene or an activity of the target of interest.

4. The video surveillance system of claim 1, wherein detecting the target of interest in the first field of view comprises:

detecting an event or an activity of the target of interest in the first field of view of the scene by comparing the first set of video primitives to at least one event rule or at least one target activity rule; and issuing a second alert based on the event or the activity of the target of interest in the first set of video primitives.

5. The video surveillance system of claim 1, wherein the operations further comprise:

detecting an event or an activity of the target of interest in the second field of view of the scene by comparing the second set of video primitives to at least one scene event rule or at least one target activity rule; and issuing a third alert based on the event or the activity of the target of interest in the second set of video primitives.

6. The video surveillance system of claim 1, wherein the operations further comprise:

determining a model of the target of interest based on the second image data, the model of the target of the target of interest describing an appearance of the target of interest and motion of the target of interest.

7. The video surveillance system of claim 1, wherein the operations further comprise:

periodically switching the camera between recording the second field of view and recording the third field of view.

8. The video surveillance system of claim 1, wherein the image quality criteria comprises:

an angle of view of a detected event or target activity, and an image resolution of a detected event or target activity.

9. A computer-implemented method for video surveillance using a camera, the method comprising:

controlling, by a processor, the camera to scan a scene using a first field of view;

determining, by the processor, a first set of video primitives using first image data received from the camera during the scan, the first set of video primitives describing targets in the first field of view, motion of the camera during the scan, and the scene in the first field of view;

detecting, by the processor, a target of interest in the first field of view using the first set of video primitives;

based on information about the target of interest in the first set of video primitives, controlling, by the processor, the camera to continuously track the target of interest using a second field of view by moving the camera;

determining, by the processor, a second set of video primitives using second image data received from the camera during the continuous tracking, the second set of video primitives describing the target of interest in the second field of view, motion of the camera during the continuous tracking, and the scene in the second field of view;

determining, by the processor, a third field of view of the target of interest using information describing the target of interest in the second set of video primitives and based on image quality criteria;

controlling, by the processor, the camera to obtain the third field of view;

determining, by the processor, that the camera has obtained in the third field of view;

determining, by the processor, a third set of video primitives using third image data received from the camera from the third field of view, the third set of video primitives describing the target of interest in the third field of view;

determining, by the processor, an identity of the target of interest using the third set of video primitives; and issuing, by the processor, an alert including the identity of the target of interest.

10. The method of claim 9, wherein the information about the target of interest in the first set of video primitives comprises an event in the scene or an activity of the target of interest.

11. The method of claim 9, wherein detecting the target of interest in the first field of view comprises:

detecting an event or an activity of the target of interest in the first field of view of the scene by comparing the first set of video primitives to at least one scene event rule or at least one target activity rule; and issuing a second alert based on the event or the activity of the target of interest in the first set of video primitives.

12. The method of claim 9, wherein the operations further comprise:

detecting an event or an activity of the target of interest in the second field of view of the scene by comparing the second set of video primitives to at least one scene event rule or at least one target activity rule; and issuing a third alert based on the event or the activity of the target of interest in the second set of video primitives.

13. The method of claim 9, wherein the operations further comprise:

determining a model of the target of interest based on the second image data, the model of the target of the target of interest describing an appearance of the target of interest and motion of the target of interest.

14. The method of claim 9, wherein the operations further comprise:
periodically switching the camera between recording the second field of view and recording the third field of view.

15. The method of claim 9, wherein the image quality criteria comprises:
an angle of view of a detected event or target activity, and an image resolution of a detected event or target activity.

16. A computer-readable storage device storing software instructions that, when executed by a processor, cause a video surveillance system to perform operations comprising:
controlling the camera to scan a scene using a first field of view;
determining a first set of video primitives using first image data received from the camera during the scan, the first set of video primitives describing targets in the first field of view, motion of the camera during the scan, and the scene in the first field of view;
detecting a target of interest in the first field of view using the first set of video primitives;
based on information about the target of interest in the first set of video primitives, controlling the camera to continuously track the target of interest using a second field of view by moving the camera;
determining a second set of video primitives using second image data received from the camera during the continuous tracking, the second set of video primitives describing the target of interest in the second field of view, motion of the camera during the continuous tracking, and the scene in the second field of view;
determining a third field of view of the target of interest using information about the target of interest in the second set of video primitives and based on image quality criteria;
controlling the camera to obtain the third field of view of the target of interest;
determining that the camera has obtained in the third field of view;
determining a third set of video primitives using third image data received from the camera from the third field of view, the third set of video primitives describing the target in the third field of view;
determining an identity of the target of interest using the third set of video primitives; and
issuing an alert including the identity of the target of interest.

* * * * *